(12) United States Patent  
Oroskar et al.

(10) Patent No.: US 8,825,044 B2  
(45) Date of Patent: Sep. 2, 2014

(54) REDIRECTING A WIRELESS COMMUNICATION DEVICE TO A DIFFERENT FREQUENCY

(75) Inventors: Siddharth S. Oroskar, Overland Park, KS (US); Sachin R. Vargantwar, Overland Park, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/044,794

(22) Filed: Mar. 10, 2011

(65) Prior Publication Data

US 2012/0231827 A1 Sep. 13, 2012

(51) Int. Cl.  
*H04W 4/00* (2009.01)

(52) U.S. Cl.  
USPC ............... 455/432.1; 455/435.2; 455/443

(58) Field of Classification Search  
USPC ............... 455/432.1–444, 453, 572–574; 370/331, 311  
See application file for complete search history.

(56) References Cited

U.S. PATENT DOCUMENTS

| | | | |
|---|---|---|---|
| 5,369,681 A | 11/1994 | Boudreau et al. | |
| 5,778,319 A | 7/1998 | Sawaki | |
| 5,787,347 A * | 7/1998 | Yu et al. ................... | 455/440 |
| 5,974,327 A | 10/1999 | Agrawal et al. | |
| 5,978,463 A | 11/1999 | Jurkevics et al. | |
| 6,069,871 A | 5/2000 | Sharma et al. | |
| 6,181,945 B1 | 1/2001 | Lee | |
| 6,185,421 B1 | 2/2001 | Alperovich et al. | |
| 6,223,042 B1 | 4/2001 | Raffel | |
| 6,243,590 B1 * | 6/2001 | Reddy et al. ................... | 455/510 |
| 6,289,227 B1 | 9/2001 | Shi | |
| 6,295,451 B1 | 9/2001 | Mimura | |
| 6,549,787 B1 | 4/2003 | Ravi | |
| 6,556,831 B1 | 4/2003 | Buppelmann | |
| 6,643,520 B1 | 11/2003 | Park et al. | |
| 6,745,039 B1 | 6/2004 | Di Lalla | |

(Continued)

FOREIGN PATENT DOCUMENTS

| | | |
|---|---|---|
| EP | 2 244 502 | 10/2010 |
| WO | 01/47287 | 6/2001 |

OTHER PUBLICATIONS

Hasswa et al., "Generic Vertical Handoff Decision Function for Heterogeneous Wireless Networks," IFIP Int. Conf. Wireless and Optical Communications Network (WOCN), pp. 239-243 (Mar. 6, 2005).

(Continued)

*Primary Examiner* — Daniel Lai (57) ABSTRACT

A wireless communication device (WCD) may be able to acquire wireless service from preferred wireless coverage areas that are managed by the WCD's service provider. In some cases, the WCD may instead use wireless service from non-preferred wireless coverage areas of the service provider's roaming partners. In order to save roaming fees, the service provider's RAN may determine when the WCD is likely to roam to a non-preferred wireless coverage area. In response to this determination, the RAN may transmit a redirect message to the WCD, causing the WCD to switch from one preferred wireless coverage area to another preferred wireless coverage area. In some situations, the RAN may transmit such a redirect message because the WCD has reported that it has a low remaining battery life.

16 Claims, 6 Drawing Sheets

(56) References Cited

U.S. PATENT DOCUMENTS

| | | | |
|---|---|---|---|
| 6,907,245 | B2 | 6/2005 | Ohlsson et al. |
| 6,922,561 | B2 | 7/2005 | Chen et al. |
| 6,963,750 | B1 | 11/2005 | Cheng et al. |
| 7,065,361 | B1 | 6/2006 | Fortuna |
| 7,099,689 | B2 | 8/2006 | Bahl et al. |
| 7,177,658 | B2 | 2/2007 | Willenegger et al. |
| 7,260,415 | B1 | 8/2007 | Oh |
| 7,317,706 | B1 | 1/2008 | Hao et al. |
| 7,317,920 | B2 | 1/2008 | Rajkotia et al. |
| 7,349,699 | B1 | 3/2008 | Kelly et al. |
| 7,366,526 | B2 | 4/2008 | Zhang et al. |
| 7,471,654 | B2 | 12/2008 | Mueckenheim et al. |
| 7,853,260 | B2 | 12/2010 | Holma et al. |
| 8,254,981 | B2 | 8/2012 | Dwyer et al. |
| 2001/0034233 | A1 | 10/2001 | Tiedemann, Jr. et al. |
| 2004/0037264 | A1 | 2/2004 | Khawand |
| 2004/0087305 | A1* | 5/2004 | Jiang et al. ............... 455/432.1 |
| 2004/0125768 | A1 | 7/2004 | Yoon et al. |
| 2004/0192306 | A1* | 9/2004 | Elkarat et al. ............ 455/435.2 |
| 2004/0252669 | A1 | 12/2004 | Hosein |
| 2005/0164718 | A1 | 7/2005 | Rajkotia et al. |
| 2005/0233746 | A1 | 10/2005 | Laroia et al. |
| 2006/0058056 | A1 | 3/2006 | Das et al. |
| 2006/0094423 | A1* | 5/2006 | Sharma et al. ............... 455/433 |
| 2006/0116125 | A1* | 6/2006 | Buckley et al. ............ 455/435.1 |
| 2006/0142032 | A1* | 6/2006 | Derakhshan et al. ......... 455/509 |
| 2006/0142051 | A1 | 6/2006 | Purnadi et al. |
| 2006/0160551 | A1 | 7/2006 | Matoba et al. |
| 2006/0274685 | A1* | 12/2006 | Johnson et al. ............... 370/328 |
| 2007/0053336 | A1 | 3/2007 | Petrovic et al. |
| 2007/0105535 | A1 | 5/2007 | Jacobson et al. |
| 2007/0173252 | A1 | 7/2007 | Jiang |
| 2007/0232330 | A1 | 10/2007 | Ranganathan |
| 2008/0025235 | A1 | 1/2008 | Mahany et al. |
| 2008/0032713 | A1 | 2/2008 | Yang |
| 2008/0081623 | A1* | 4/2008 | Burgan et al. ............... 455/436 |
| 2008/0096520 | A1 | 4/2008 | Benco et al. |
| 2008/0233945 | A1* | 9/2008 | Gummadi et al. ......... 455/422.1 |
| 2008/0293419 | A1 | 11/2008 | Somasundaram et al. |
| 2008/0293437 | A1 | 11/2008 | Ranganathan et al. |
| 2009/0016328 | A1 | 1/2009 | Peisa et al. |
| 2009/0061854 | A1 | 3/2009 | Gillot et al. |
| 2009/0247137 | A1 | 10/2009 | Awad |
| 2009/0285113 | A1* | 11/2009 | Yavuz et al. ............... 370/252 |
| 2010/0120437 | A1* | 5/2010 | Foster et al. ............... 455/444 |
| 2010/0246532 | A1 | 9/2010 | Olvera-Hernandez et al. |
| 2010/0268674 | A1* | 10/2010 | Dwyer et al. ............... 706/12 |
| 2010/0311420 | A1 | 12/2010 | Reza et al. |
| 2011/0021195 | A1* | 1/2011 | Cormier et al. ............ 455/435.2 |
| 2011/0021197 | A1 | 1/2011 | Ngai |
| 2011/0034167 | A1 | 2/2011 | Ben-Shaul et al. |
| 2012/0149373 | A1* | 6/2012 | Tian et al. ............... 455/436 |
| 2012/0213123 | A1 | 8/2012 | Futaki |
| 2012/0282931 | A1 | 11/2012 | Giustina et al. |

OTHER PUBLICATIONS

NTT DoCoMo et al., "IDLE Mode Mobility Control Principles," 3GPP TSG RAN WG2 #59BIS; 3GPP Draft; R2-074001, 8 pages, Oct. 8-12, 2007.

NTT DoCoMo et al., "Load Balancing Solutions for LTE," 3GPP TSG RAN WG2 #58bis; 3GPP Draft; R2-072719, 5 pages, Jun. 22, 2007.

International Search Report and Written Report for PCT/US2012/028070 mailed May 7, 2012, 15 pages.

U.S. Appl. No. 12/261,229, filed Oct. 30, 2008.
U.S. Appl. No. 12/553,661, filed Sep. 3, 2009.
U.S. Appl. No. 12/558,359, filed Sep. 11, 2009.
U.S. Appl. No. 12/572,829, filed Oct. 2, 2009.
U.S. Appl. No. 12/690,629, filed Jan. 20, 2010.
U.S. Appl. No. 12/756,027, filed Apr. 7, 2010.
U.S. Appl. No. 12/776,287, filed May 7, 2010.
U.S. Appl. No. 12/786,174, filed May 24, 2010.
U.S. Appl. No. 12/786,184, filed May 24, 2010.
U.S. Appl. No. 12/854,119, filed Aug. 10, 2010.

L. Cai et al., "Mitigating DoS Attacks on the Paging Channel by Efficient Encoding in Page Messages," In:Proceedings of 5th International ICST Conference on Security and Privacy in Communication Networks (SecureComm 2009), Sep. 2009.

Vargantwar et al., U.S. Appl. No. 12/815,700, filed Jun. 15, 2010, 41 pages.

Vargantwar et al., U.S. Appl. No. 12/815,709, filed Jun. 15, 2010, 42 pages.

Vargantwar et al., U.S. Appl. No. 12/847,198, filed Jul. 30, 2010, 36 pages.

Vondekamp et al., U.S. Appl. No. 11/535,870, filed Sep. 27, 2006, 29 pages.

Office Action for U.S. Appl. No. 11/535,870 dated Apr. 3, 2009, 14 pages.

Final Office Action for U.S. Appl. No. 11/535,870 dated Nov. 12, 2009, 22 pages.

Advisory Action for U.S. Appl. No. 11/535,870 dated Feb. 18, 2010, 14 pages.

Office Action for U.S. Appl. No. 12/853,730 dated Jan. 18, 2012, 13 pages.

Office Action for U.S. Appl. No. 12/815,700 dated Dec. 14, 2011, 9 pages.

Office Action for U.S. Appl. No. 12/815,709 dated Feb. 21, 2012, 5 pages.

TIA Standard, "Interoperability Test Specification for cdma2000® Air Interface," TIA-1036, Section 3.11, Jan. 2005, 4 pages.

TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001, 24 pages.

3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.50052-A, Version 1.0, Apr. 22, 2005, 198 pages.

Office Action for U.S. Appl. No. 13/010,387 mailed Apr. 29, 2013, 22 pages.

Office Action for U.S. Appl. No. 12/909,165 mailed Oct. 24, 2012, 15 pages.

Fennell, Shawn, U.S. Appl. No. 11/499,581 mailed Aug. 4, 2006, 12 pages.

Oroskar et al., U.S. Appl. No. 12/853,730, filed Aug. 10, 2010, 48 pages.

Oroskar et al., U.S. Appl. No. 12/854,114, filed Aug. 10, 2010, 48 pages.

Oroskar, Siddharth S., U.S. Appl. No. 12/909,165, filed Oct. 21, 2010, 35 pages.

Oroskar et al., U.S. Appl. No. 13/010,387, filed Jan. 20, 2011, 40 pages.

* cited by examiner

| WCD IDENTIFIER | RECENT VISITS (CALLS) | RECENT VISITS (CALLS) RESULTING IN RAPID HANDOFF TO A NON-PREFERRED WIRELESS COVERAGE AREA | PERCENTAGE |
|---|---|---|---|
| 312-555-1000 | 5 | 0 | 0% |
| 312-555-1001 | 14 | 7 | 50% |
| 312-555-1002 | 80 | 8 | 10% |
| 312-555-1003 | 3 | 3 | 100% |

FIG. 4

REDIRECTING A WIRELESS COMMUNICATION DEVICE TO A DIFFERENT FREQUENCY

BACKGROUND

Wireless service providers typically design a wireless network to define a number of partially-overlapping or fully-overlapping wireless coverage areas on various frequencies. As a wireless communication device (WCD) that is subscribed to the wireless service provider moves about, the wireless network may hand off the WCD from one wireless coverage area to another. A goal of performing these handoffs is to provide a substantially continuous wireless coverage to the WCD, so that any communication sessions conducted by the WCD are not dropped or degraded due to loss of wireless coverage.

However, it is not economically feasible for any given wireless service provider to deploy perfect wireless coverage. Thus, wireless service providers often partner with other wireless service providers to form roaming agreements. According to these roaming agreements, when a wireless service provider cannot provide a reasonable wireless coverage to a WCD, the WCD may instead be served by one of the wireless service provider's roaming partners. Consequently, the roaming partner provides wireless service for the WCD for a period of time, typically until the wireless service provider can once again provide a reasonable wireless coverage to the WCD.

While roaming agreements may result in a better overall wireless coverage for WCDs, and therefore a better experience for WCD users, there are drawbacks to letting a WCD roam. One such drawback is that, while roaming, the WCD may not have access to applications and services offered by the wireless service provider. Another drawback to roaming is that the roaming partner may charge the wireless service provider a fee for each unit of time, unit of data, or transaction that the roaming partner serves a roaming WCD. Other drawbacks may exist as well.

OVERVIEW

According to the embodiments herein, a WCD subscribed to a wireless service provider may be served by a wireless coverage area defined at a given frequency. The wireless service provider may be able to determine when the WCD is likely to roam, and may responsively and/or proactively take steps to reduce the likelihood of this roaming. For example, the wireless service provider may redirect the WCD from the given frequency to a different frequency.

In these embodiments, the wireless service provider may operate and/or control a radio access network (RAN) that provides wireless coverage areas to serve WCDs. The wireless service provider may categorize wireless coverage areas that the wireless service provider operates and/or controls as "preferred," while categorizing wireless coverage areas that the wireless service provider's roaming partners operate and/or control as "non-preferred."

The preferred wireless coverage areas may be defined at various frequencies. Due to the physical nature of wireless communication at these frequencies, wireless coverage areas defined on lower frequencies may exhibit a wider coverage (due to, e.g., less attenuation) than wireless coverage areas defined on higher frequencies. Thus, when all other factors are the same, using lower-frequency wireless coverage areas may be more desirable than using higher-frequency wireless coverage areas for at least this reason.

However, the wireless service provider may only have access to a limited extent of lower-frequency wireless coverage areas. As a result, the wireless service provider may assign some WCDs to higher-frequency wireless coverage areas in order to reduce load on the lower-frequency wireless coverage areas. Given the limited range of these higher-frequency wireless coverage areas, a WCD served by a higher-frequency wireless coverage area may be more likely to be handed off than a WCD served by a lower-frequency wireless coverage area. If this handoff is to a non-preferred wireless coverage area, the WCD (and its subscriber) may be roaming, and as a result may suffer from the aforementioned disadvantages of roaming.

Therefore, the wireless service provider may seek to avoid handing off a WCD to a non-preferred wireless coverage area, or at least seek to decrease the likelihood of the WCD being handed off to a non-preferred wireless coverage area. For example, the wireless service provider may consider roaming data associated with the WCD when determining whether to take steps to decrease the likelihood of the handoff occurring. This roaming data may be, for instance, historical data representing the WCD's past handoff behavior.

Accordingly, in an example embodiment, a RAN may define a first preferred wireless coverage area on a first frequency and a second preferred wireless coverage area on a second frequency. The second frequency may be lower than the first frequency. The RAN may serve a WCD via the first preferred wireless coverage area.

The RAN may determine that the WCD is likely to begin roaming. This determination may involve, for example, the RAN finding that roaming data indicates that the WCD is likely to be handed off from the first preferred wireless coverage area to any one of a group of one or more non-preferred wireless coverage areas. Based on at least the WCD being likely to begin roaming, the RAN may transmit, to the WCD, a redirect message that causes the WCD to (i) de-register from the first preferred wireless coverage area, and (ii) register with the second preferred wireless coverage area.

There may be additional benefits to a WCD being served by a lower-frequency wireless coverage area. For example, since lower-frequency wireless signals generally suffer from less attenuation than higher-frequency wireless signals, the WCD may be able to transmit information to the RAN at a lower power level than if the WCD was served via a higher-frequency wireless coverage area. Thus, the more extensive coverage of the lower-frequency wireless coverage area (at least when compared to most higher-frequency wireless coverage areas) may result in the WCD's battery being drained more slowly.

Accordingly, in another example embodiment, the RAN may receive a measurement of a remaining battery life of the WCD. The RAN may then determine that the remaining battery does not meet a battery life threshold. In response to the remaining battery life not meeting the battery life threshold, the RAN may transmit, to the WCD, a redirect message that causes the WCD to (i) de-register from the first preferred wireless coverage area, and (ii) register with the second preferred wireless coverage area. In this way, a WCD may be able to extend its battery life by using a lower frequency.

These and other aspects and advantages will become apparent to those of ordinary skill in the art by reading the following detailed description, with reference where appropriate to the accompanying drawings. Further, it should be understood that the foregoing overview is merely for purposes of example and is not intended to limit the scope of the invention as claimed.

DESCRIPTION

I. Network Architecture

Figure 1A:
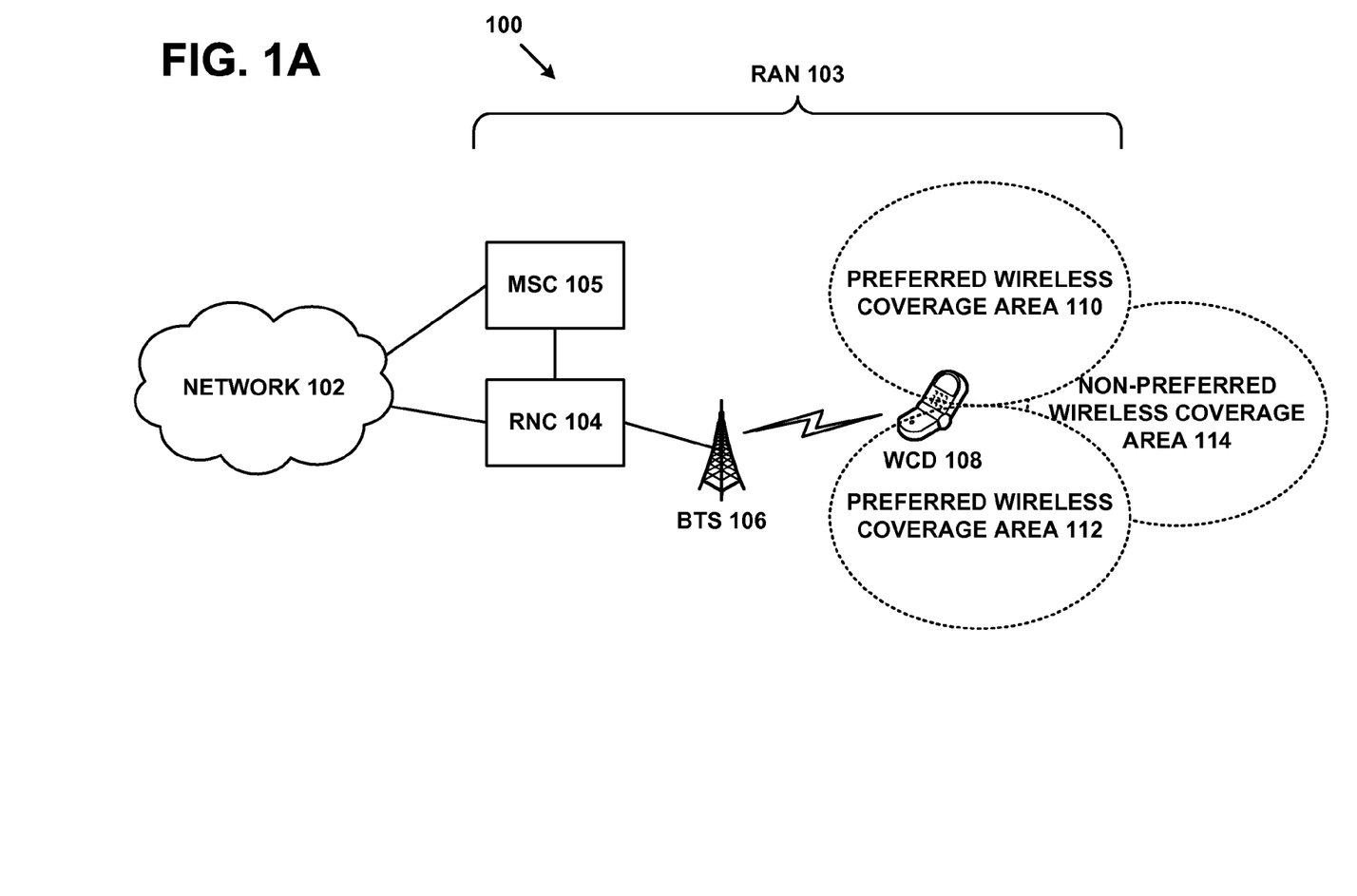
FIG. 1A depicts a RAN controlling preferred wireless coverage areas that are within range of a non-preferred wireless coverage area, in accordance with an example embodiment.

FIG. 1A depicts an example communication system 100 in which example embodiments can be carried out or deployed. At a high level, communication system 100 comprises a network 102, a RAN 103, preferred wireless coverage areas 110 and 112, and non-preferred wireless coverage area 114. Any of the wireless coverage areas may provide wireless communication services to WCD 108.

Network 102 is preferably a packet-switched and/or circuit-switched communication network that links RAN 103 to other networks, devices, applications, and/or services. Network 102 may be, for instance, the Internet, a private IP network, the public-switched telephone network (PSTN) or a private circuit-switched network. Network 102 may comprise one or more switches, gateways, routers, signaling nodes, application servers, and/or other types of devices, systems and networks. In one possible embodiment, network 102 includes both packet-switching and circuit-switching capabilities.

RAN 103 may include a radio network controller (RNC) 104, a mobile switching center (MSC) 105, and a base transceiver station (BTS) 106. However, for sake of simplicity, FIG. 1 excludes some components that could be found in a RAN, such as softswitches, media gateways, media gateway controllers, signaling nodes, authentication servers, registration servers, and so on. Furthermore, throughout this description, the term "RAN component" may be used to refer to a BTS, an RNC, a combination of one or more BTSs and an RNC, or any other type of component used for RAN functionality.

BTS 106 may radiate on one or more frequencies to define preferred wireless coverage areas, such as preferred wireless coverage areas 110 and 112. Preferred wireless coverage areas 110 and 112, may, in turn, serve WCD 108 via an air interface that comprises one or more forward link and/or reverse link channels. These channels may be formed via a set of orthogonal Code Division Multiple Access (CDMA) codes, each of which may be used to modulate the data transmitted on a particular channel. Further, BTS 106 may include a power amplifier, such as a tower-top amplifier (and possibly multiple power amplifiers, with one for each wireless coverage area BTS 106 defines), arranged to amplify signals for transmission over the respective air interface to WCDs.

The forward link channels, which carry data from BTS 106 to WCD 108, may include a pilot channel, over which a phase offset pattern is repeatedly transmitted, a sync channel over which synchronization data, such as a timing reference, is transmitted, and traffic channels over which bearer traffic directed to WCD 108 is transmitted. Additionally, one or more of the forward link CDMA codes may be designated as primary and/or secondary paging channels, used for contacting WCDs.

The reverse link channels may also be formed through the use of CDMA. These reverse link channels may include, for example, an access channel for transmitting access probe messages and/or responding to paging messages, and reverse traffic channels for transmitting bearer traffic from WCD 108 to BTS 106. Thus, through the forward and reverse link channels, BTS 106 and WCD 108 may exchange signaling and bearer traffic.

Of course, CDMA is not the only technology that can provide wireless forward and reverse link channels, and other technologies may be used instead. These other technologies include, but are not limited to, Worldwide Interoperability for Microwave Access (WIMAX®), Universal Mobile Telecommunications System (UMTS®), Long Term Evolution (LTE®), IDEN®, or 802.11 (Wifi). Thus, RAN 103 may operate according to one or more of CDMA, any of these other technologies, and/or additional technologies now known or developed in the future.

Along with performing other tasks, RNC 104 may manage the wireless resources associated with BTS 106, and route traffic to and from BTS 106. Further, RNC 104 may be able to facilitate handoff of WCD 108 from one wireless coverage area to another (e.g., from preferred wireless coverage area 110 to preferred wireless coverage area 112, or from preferred wireless coverage area 110 to non-preferred wireless coverage area 114). In addition to or instead of an RNC such as RNC 104, a base station controller (BSC), or some other type of device, may be used to control the operation of BTS 106. Regardless of the exact configuration, RNC 104 may be communicatively coupled to network 102 either directly or via one or more links or other devices. For instance, RNC 104 may communicate with network 102 via MSC 105, or via an access gateway (not shown), such as a packet data serving node (PDSN) or an access serving network gateway (ASN-GW).

MSC 105 may perform many of the functions of a Class 5 telephony switch, but with additional functionality to manage the mobility of subscriber devices, such as WCD 108. For example, an MSC may comprise a visitor location register (VLR) and a home location register (HLR). The MSC may be responsible for switching functions, media transport functions, transcoding functions, short message service (SMS) functions, and managing the communications between WCDs and any the circuit switched functions of network 102 or other networks.

Furthermore, MSC 105, or any RAN component, may track subscriber usage to facilitate billing and performance monitoring. To do so, for each voice call that the MSC 105 handles, MSC 105 may generate a Call Detail Record (CDR). The CDR may take various forms but often includes certain information about the call, such as the originating number, terminating number, the sector or sectors in which the call occurred, start time, stop time, and/or call type (e.g., local or long-distance, voice or data, and so on). RAN components that generate CDRs may send these CDRs to a central entity that maintains a database in which the CDRs are compiled. In addition to CDRs, one or more RAN components, such as a PDSN, may generate usage data records (UDRs) containing information regarding subscriber usage for data calls. Other types of data records may also be generated, and may contain information regarding subscriber usage for voice calls, data calls, or both.

WCD 108 may be one of potentially many WCDs served by preferred wireless coverage area 110. Such a WCD could be a wireless telephone, a wireless personal digital assistant, a wirelessly equipped laptop computer, a tablet computer, an electronic book reader, a wireless router, or another type of mobile or fixed wireless device. Preferably, a WCD is a subscriber device that is manipulated by a human in order to establish circuit-switched or packet-switched voice and/or data calls. However, a WCD could also be an automated device without a human interface.

A WCD may be associated with zero or more RANs at a time and may use the wireless coverage areas of these RANs to communicate, via network 102, with correspondent nodes, such as web servers, gaming servers, short message service (SMS) servers, signaling and media nodes, and other WCDs. Thus, a WCD may be in communication with one or more preferred and/or non-preferred wireless coverage areas simultaneously, even if the WCD is only using one of these wireless coverage areas to communicate with the correspondent nodes. As a result, the WCD may be receiving forward link signals from each of these wireless coverage areas.

Preferred wireless coverage area 110 may be defined by BTS 106 radiating on one or more frequencies. Preferred wireless coverage area 112 may also be defined by BTS 106 or by another BTS under control of the wireless service provider radiating on the same or on different frequencies. Non-preferred wireless coverage area 114 may be defined by a BTS under the control of other entities radiating on one or more frequencies. The frequencies used to define each of these wireless coverage areas may be overlapping, in order to facilitate soft handoffs (see below), or may be non-overlapping in order to reduce interference.

While more than one frequency may be used to define a wireless coverage area, for sake of simplicity, each wireless coverage area described herein is referred to as being defined on a given frequency. This given frequency may be a carrier or subcarrier frequency, and RAN 103 may use frequencies surrounding this given frequency when communicating with WCDs. Thus, the given frequency and/or the band of frequencies surrounding the given frequency may define a wireless channel.

Although three wireless coverage areas are shown in FIG. 1A, the embodiments herein may make use of more or fewer wireless coverage areas. For example, RAN 103 may radiate to define more than two preferred wireless coverage areas. Similarly, there may be more than one non-preferred wireless coverage area. While FIG. 1A depicts the physical coverage of preferred wireless coverage area 110 partially overlapping with that of preferred wireless coverage area 112 and non-preferred wireless coverage area 114, preferred wireless coverage area 110 may overlap with these wireless coverage areas more or less than is shown. Thus, for instance, preferred wireless coverage area 110 may fully overlap or not overlap at all with one or more of non-preferred wireless coverage areas 112 and 114.

It should be understood that FIG. 1A is presented merely for purposes of example. Therefore, communication network 100 may comprise more or fewer components in different arrangements than shown. Further, each of these devices, such as RNC 104 and BTS 106, may include multiple physical or logical components arranged to operate in conjunction with one another. On the other hand, these devices may be able to be combined with one another into a smaller number of logical or physical devices. In sum, changes may be made to the arrangement illustrated by FIG. 1A without departing from the scope of the invention.

Figure 1B:
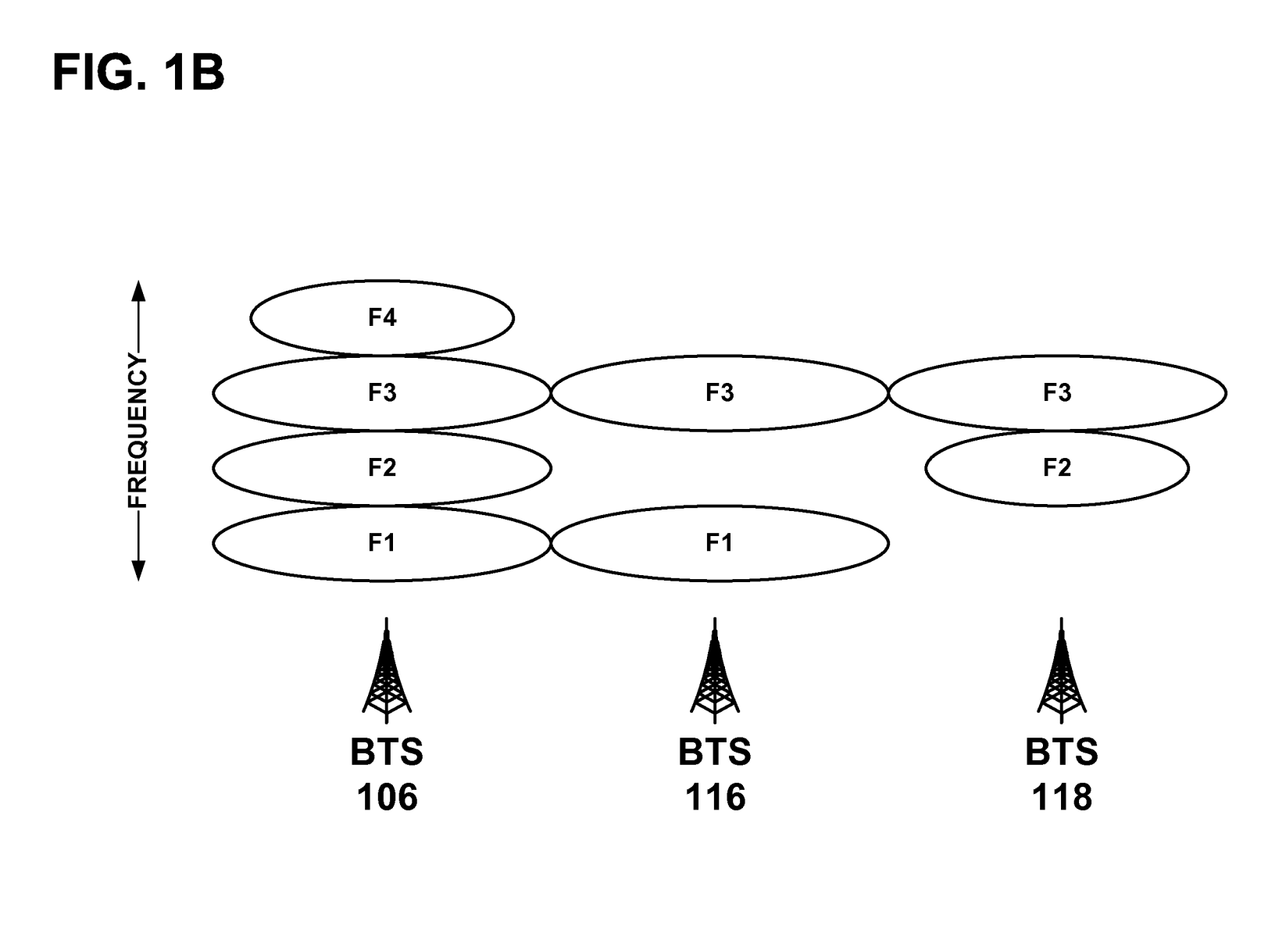
FIG. 1B depicts a number of wireless coverage areas defined on various frequencies in accordance with an example embodiment.

FIG. 1B depicts example wireless coverage areas defined by three BTSs, BTS 106, BTS 116, and BTS 118. BTS 106 defines four wireless coverage areas, one defined using each of frequencies F1, F2, F3, and F4. Preferably, these frequencies are separated by sufficiently large guard bands so that BTS 106 can communicate simultaneously with WCDs on each frequency without substantial interference.

BTS 116 defines two wireless coverage areas, one defined using frequency F1 and the other defined using frequency F3. BTS 118 also defines two wireless coverage areas, one defined using frequency F2 and the other defined using frequency F3. As depicted in FIG. 1B, frequency F1 may be a lower frequency than frequency F2, frequency F2 may be a lower frequency than frequency F3, and frequency F3 may be a lower frequency than frequency F4. However, other arrangements are possible without departing from the spirit of the embodiments herein.

BTS 106 and BTS 116 may be physically neighboring one another, and arranged to define at least some wireless coverage areas that provide continuous coverage across the physical locations covered by these BTSs. For example, BTS 106 and BTS 116 both define wireless coverage areas on frequencies F1 and F3. Furthermore, these BTSs define wireless coverage areas using frequencies F1 and F3 so that the wireless coverage areas using these frequencies are adjacent to one another. Thus, a WCD assigned to either frequency F1 or frequency F3 that is handed off from BTS 106 to BTS 116 (or vice versa), can continue communicating on the same frequency after it is handed off.

Generally speaking, when a WCD is handed off from a first BTS to a second BTS while the WCD is engaged in a call, it is possible for the WCD's call to be dropped. However, it is more likely that the WCD's call is dropped when the WCD is assigned to a different frequency by the second BTS, than if the WCD is assigned to the same frequency by the second BTS. Accordingly, wireless network operators may seek to arrange their wireless networks to provide multiple physically adjacent wireless coverage areas on certain frequencies. For instance, in FIG. 1B, BTS 106, BTS 116, and BTS 118 all define wireless coverage areas on frequency F3. These wireless coverage areas are adjacent, thus facilitating broad wireless coverage. Therefore, a WCD may be handed off from BTS 106 to BTS 116 and then from BTS 116 to BTS 118, with a relatively low probability of suffering a dropped call during these handoffs.

It should be understood that each wireless coverage area defined by a given BTS may be of a different size and/or shape. For instance, as depicted in FIG. 1B, the wireless coverage area defined by BTS 106 on frequency F4 may be smaller than the other wireless coverage areas defined by BTS 106. Similarly, the wireless coverage area defined by BTS 118 on frequency F2 may be smaller than the wireless coverage area defined by BTS 118 on frequency F3.

A wireless network operator may determine the number of wireless coverage areas for a given BTS based on the wireless network traffic expected or observed near the given BTS. BTSs located in or near a physical location with a high population density may be arranged to define a relatively large number of wireless coverage areas, while BTSs located in or near a physical location with a low population density may define a relatively small number of wireless coverage areas. Thus, for instance, BTS 106 may be in a densely populated area exhibiting a large number of WCDs that generate a large amount of total wireless network traffic, because it defines four wireless coverage areas. However, BTS 116 and BTS 118 may be in less densely populated areas where fewer WCDs generate less total wireless network traffic, because each of these BTSs only define two wireless coverage areas.

While mobile wireless communication may occur on virtually any frequency, some frequencies are more commonly used for this purpose than others. For example, the frequency bands of 698-960 MHz, 1710-2025 MHz, 2110-2200 MHz and 2500-2690 MHz are typically used by wireless service providers to provide 1st generation (1G), 2nd generation (2G), 3rd generation (3G), and 4th generation (4G) wireless services.

An individual wireless service provider's spectrum may be split over one or more of these ranges (or over any other applicable ranges). Thus, for example, frequency F1 may be in the 698-960 MHz range, frequency F2 may be in the 1710-2025 MHz range, frequency F3 may be in the 2110-2200 MHz range, and frequency F4 may be in the 2500-2690 MHz range. Alternatively, any number of these frequencies may be in the same range, e.g., frequencies F1, F2, F3, and F4 may all be in the 698-960 MHz range. In general, any of frequencies F1, F2, F3, and F4 may be in any of these ranges, or in other ranges.

II. RAN Component Embodiment

Figure 2:
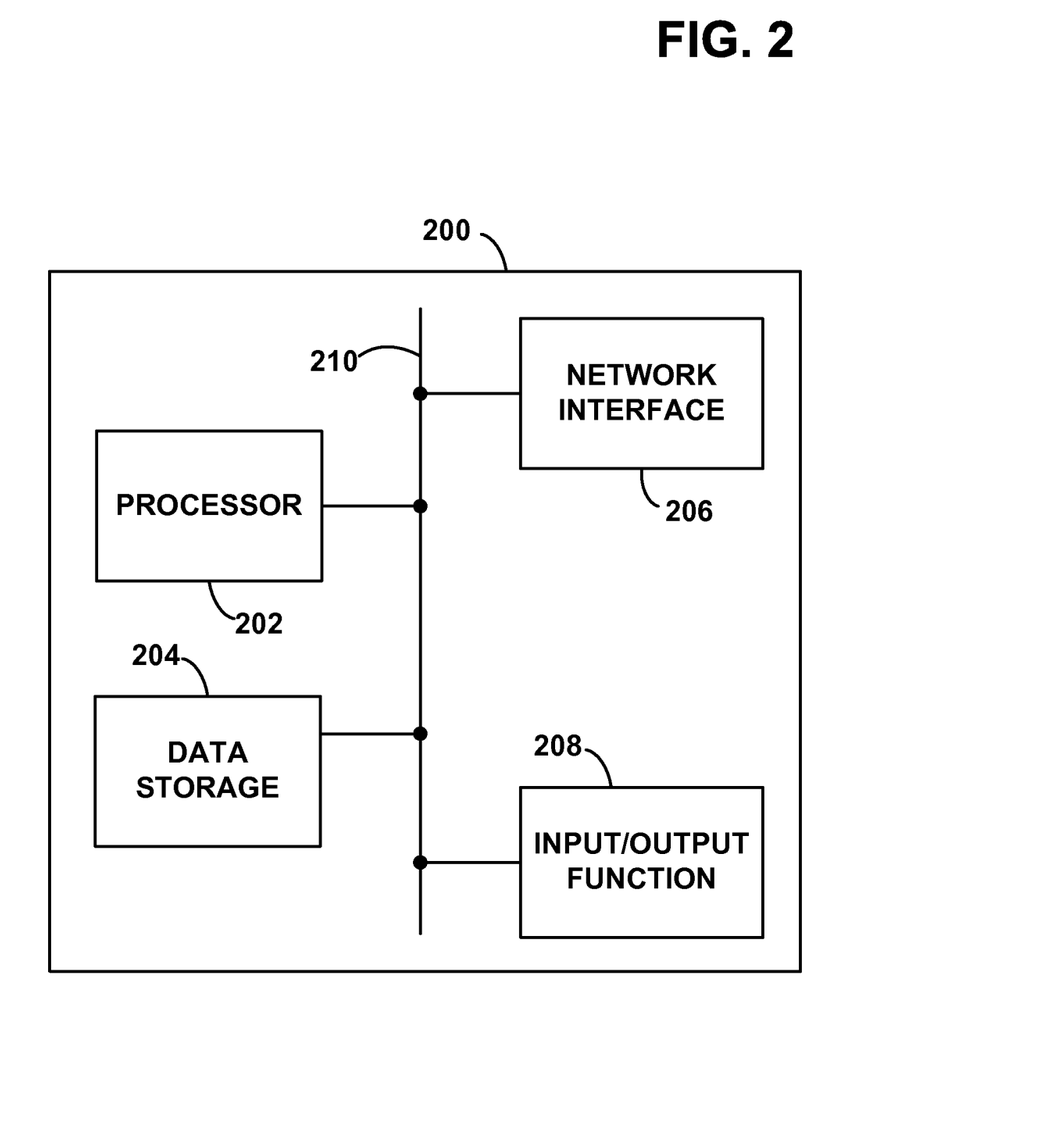
FIG. 2 is a block diagram of a RAN component, in accordance with an example embodiment.

FIG. 2 is a simplified block diagram exemplifying a RAN component 200, and illustrating some of the functional components that would likely be found in a RAN component arranged to operate in accordance with the embodiments herein. Example RAN component 200 could be any type of device found in or associated with a RAN, such as a BTS, an RNC, and/or an MSC. For purposes of simplicity, this specification may equate RAN component 200 to an RNC from time to time. Nonetheless, it should be understood that the description of RAN component 200 could apply to any component used for the purposes described herein.

Example RAN component 200 preferably includes a processor 202, a data storage 204, a network interface 206, and an input/output function 208, all of which may be coupled by a system bus 210 or a similar mechanism. Processor 202 preferably includes one or more CPUs, such as one or more general purpose processors and/or one or more dedicated processors (e.g., application specific integrated circuits (ASICs) or digital signal processors (DSPs), etc.)

Data storage 204, in turn, may comprise volatile and/or non-volatile memory and can be integrated in whole or in part with processor 202. Data storage 204 preferably holds program instructions, executable by processor 202, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions executable by processor 202 to carry out any of the methods, processes, or functions disclosed in this specification or the accompanying drawings. Therefore, data storage 204 may be a non-transitory computer-readable medium, having stored thereon program instructions that, if executed by a computing device (such as a RAN component), cause the computing device to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example RAN component 200. Input/output function 208 may comprise multiple types of input devices, such as a keyboard, a mouse, a touch screen, and so on. Similarly, input/output function 208 may comprise multiple types of output devices, such as a monitor, printer, or one or more light emitting diodes (LEDs). Additionally or alternatively, example RAN component 200 may support remote access from another device, via network interface 206 or via another interface (not shown), such an RS-232 or Universal Serial Bus (USB) port.

III. Roaming Agreements Between Wireless Service Providers

Turning back to FIG. 1A, each WCD may be subscribed to, or otherwise associated with, a wireless service provider. Therefore, for instance, WCD 108 may be subscribed to the wireless service provider that controls and/or operates preferred wireless coverage area 110. (For sake of clarity, hereinafter this wireless service provider will be referred to as the "home wireless service provider.") One way in which these subscriptions could be established is that a user of one of these WCDs may purchase or lease their WCD from the home wireless service provider. Then, for pre-determined fees, the WCD may be used to communicate via any of the home wireless service provider's wireless coverage areas. Alternatively, a user of the WCD may purchase or lease the WCD from a third-party entity, such as a wholesaler or reseller, and then register the WCD for service with the home wireless service provider.

In most cases, as noted above, it is not economically feasible for any given wireless service provider to deploy perfect wireless coverage. For instance, even a nationwide wireless service provider may not provide wireless coverage areas in sparsely-populated rural locations, or even to some urban or suburban locations. Also, in some circumstances, the signals from a wireless coverage area may not penetrate very far into buildings, leaving coverage gaps in these structures. Additionally, a wireless service provider may not be able to provide service to a WCD in a given location if the wireless service provider's wireless coverage areas are near or at full capacity in that location.

Thus, wireless service providers often partner with other wireless service providers to form roaming agreements. According to these roaming agreements, when a wireless service provider cannot provide a reasonable wireless coverage to a WCD, the WCD may instead be served by one of the wireless service provider's roaming partners. Consequently, the roaming partner provides wireless service to the WCD for a period of time, typically until the wireless service provider can once again provide a reasonable wireless coverage to the WCD. Roaming partners may be wireless service providers in their own right, and therefore may also serve their own subscribed WCDs. In FIG. 1, non-preferred wireless coverage area 114 may be controlled and/or operated by a roaming partner of the home wireless service provider.

It may be advantageous for the home wireless service provider to have one or more roaming partners, because allowing WCD 108 to use these roaming partners' wireless service areas may increase the overall wireless coverage available to WCD 108. However, roaming agreements between wireless service providers often involve the assessment of fees. For example, a roaming partner of the home wireless service provider may charge the home wireless service provider when WCD 108 uses one or more of the roaming partner's wireless coverage areas. Typically, no fees are charged if a roaming WCD is idle. But, if the roaming WCD makes a substantial use of the roaming partner's wireless coverage area(s), the home wireless service provider may be charged for that use. Such a substantial use might include, for example, making a voice or data call, or sending or receiving a text or multimedia message.

The fee for this use may be assessed on a per-time-unit basis, per-data-unit basis, per transaction basis, or some other basis. Thus, for example, if a WCD participated in a voice or data call while roaming, a fee may be assessed based on the number of minutes (or fractions of minutes) that the call lasted (e.g., three cents per minute). Alternatively, the fee may be based on the amount of data transferred to and/or from the WCD during the course of the call (e.g., twenty-five cents per megabyte of data sent or received by the WCD). For some applications or services, such as text or multimedia messaging, fees may be assessed on a per-transaction basis (e.g., ten cents per text message).

While the home wireless service provider can pass on some or all of these roaming fees to the user of the WCD, it still may be advantageous for the home wireless service provider to try to avoid having at least some subscribed WCDs roam. Alternatively, if roaming cannot reasonably be avoided, it may be advantageous for the home wireless service provider to mitigate the impact of the roaming. In other words, the home wireless service provider may be able to manage the roaming of subscribed WCDs such that roaming fees are reduced. The effect of doing so may be lower costs paid by users, resulting in higher user satisfaction with the home wireless service provider.

IV. Idle and Active WCD Handoff

An "idle" WCD (i.e., a WCD that is not exchanging bearer data with a BTS) may register with a primary wireless coverage area (which may be a preferred wireless coverage area or a non-preferred wireless coverage area), and listen to the paging channel of the primary wireless coverage area for incoming call indications, and other information, from the RAN. The RAN may transmit system parameter messages and/or neighbor list messages to the WCD via this primary paging channel. These messages may contain PN offsets of the pilot channels emitted by BTSs that define neighboring preferred or non-preferred wireless coverage areas.

An idle WCD may measure the pilot channel signal strength that it receives from its primary wireless coverage area and each of these neighboring wireless coverage areas. If, for some period of time, WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and register with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD engages in a voice or data call, the WCD may use the primary wireless coverage area's paging channel and access channel to establish the call. For example, when an idle WCD originates a new outgoing call (i.e., the WCD is the caller), the WCD may transmit one or more access probe (or origination) messages to the RAN via the access channel of the primary wireless coverage area. Each access probe message may contain an identification of the WCD seeking to establish the call, as well information specific to the nature of the request, such as the type of call or session being sought, among other possible details.

The RAN may respond to an access probe message by assigning one or more traffic channels from one or more wireless coverage areas to the WCD. To that end, the RAN may transmit, via the paging channel, an indication of this assignment (e.g., PN offsets and/or Walsh codes of the assigned traffic channels). This transmission may take the form of one or more channel assignment messages directed to the WCD. Then, the now active WCD (i.e., being assigned traffic channel(s), the WCD is no longer "idle") may use the assigned traffic channel(s) for simultaneously transmitting and/or receiving bearer data for the voice or data call.

During a call, a WCD may communicate via a number of "active" wireless coverage areas at the same time. Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

Regularly, or from time to time, the WCD may measure the signal-to-noise ratio (SNR) and/or the frame error rate (FER) of a channel (e.g., a pilot channel) from each of these wireless coverage areas, to determine the respective received signal strengths of each wireless coverage area. When WCD determines that the received signal strength of its serving wireless coverage area has dropped below a signal-strength threshold, or the received signal strength of another wireless coverage area in the active set exceeds that of the serving wireless coverage area by some amount, the WCD may request a handoff from the serving wireless coverage area to a wireless coverage area from which the WCD has received a higher signal strength. Additionally, the WCD may add or remove wireless coverage areas from the active set based on these signal strengths or for other reasons.

V. Reducing the Likelihood of Roaming

It may be generally desirable for a home service provider to reduce the likelihood that WCDs subscribed to the home service provider roam to wireless coverage areas controlled and/or operated by roaming partners. One way of achieving this goal is to detect, based on roaming data, when a particular WCD is likely to be handed off from a preferred wireless coverage area to a non-preferred wireless coverage area.

Referring again to FIG. 1A, WCD 108 may be served by preferred wireless coverage area 110. If, in the past, WCD 108 has exhibited a tendency to begin roaming to an adjacent non-preferred wireless coverage area while served by preferred wireless coverage area 110, then it may be likely that WCD 108 will do so again. For instance, suppose that WCD 108 has been served by preferred wireless coverage area 110 ten times in the last week. If WCD 108 roamed from preferred wireless coverage area 110 to non-preferred wireless coverage area 114 during seven of those ten times, then WCD 108 has demonstrated a tendency to roam. In this case, 70% of the time that WCD 108 was served by preferred wireless coverage area 110, WCD 108 roamed to a wireless coverage area of a roaming partner. This roaming may occur while WCD 108 is either idle or active.

There are several possible reasons for why WCD 108 could exhibit this behavior. WCD 108 might have hardware, software, or mechanical characteristics that make it difficult for WCD 108 to transmit or receive properly on the frequency or frequencies used by preferred wireless coverage area 110. For example, WCD 108 might be a relatively old model with a transceiver that has deteriorated over time. Even if WCD 108 is not able to transmit or receive properly via preferred wireless coverage area 110, WCD 108 may be able to transmit and receive properly on other preferred or non-preferred wireless coverage areas. For instance, WCD 108 may be able to communicate with fewer problems when using the frequency of preferred wireless coverage area 112. In other words, communication problems that WCD 108 experiences in preferred wireless coverage area 110 may or may not occur in other wireless coverage areas.

Another possible reason for WCD 108 being handed off to a non-preferred wireless coverage area with some regularity could be the physical location in which WCD 108 is typically used. For instance, a user of WCD 108 may live, work, or spend a substantial amount of time near a border of preferred wireless coverage area 110. Due to this physical proximity to the border, the signal strength of preferred wireless coverage area 110 received by WCD 108 may be poor. Alternatively, the user of WCD 108 may spend a substantial amount of time in a physical location within the bounds of preferred wireless coverage area 110, but still receive a poor signal strength from this wireless coverage area. For example, this location could be a basement or the center of a large structure. Under such conditions, WCD 108 may frequently roam to non-preferred wireless coverage area 114. As another example, the user of the WCD may simply be a highly mobile user, or may be highly mobile in a particular region.

For any one or more of these reasons, or for other reasons, a RAN may determine that a WCD is likely to roam from a preferred wireless coverage area to a non-preferred wireless coverage in the future. In order to avoid this sort of roaming in at least some situations, the RAN may contain logic that (i) determines that a given WCD is likely to begin roaming to a non-preferred wireless coverage area, and (ii) in response to making this determination, takes steps to reduce the likelihood that the WCD begins roaming.

a. Detecting that a WCD is Likely to Begin Roaming to a Non-Preferred Wireless Coverage Area In order to detect that a WCD is likely to begin roaming to a non-preferred wireless coverage, a RAN may have access to information such as that in FIG. 3. Table 300 in FIG. 3 contains entries 302, 304, 306, and 308 of example data that could assist a RAN in performing this task. For each entry, table 300 stores a WCD identifier, a number of recent visits/calls, another number of recent visits/calls resulting in a rapid handoff to a non-preferred wireless coverage area, and a percentage. Herein, a "handoff" is to be interpreted broadly. Thus, a WCD being "handed off" from a preferred wireless coverage area to a non-preferred wireless coverage area includes scenarios in which the WCD is active (participating in communication via the preferred wireless coverage area) when the handoff occurs, as well as scenarios in which the WCD is idle (not participating in communication via the preferred wireless coverage area) when the handoff occurs.

Figure 3:
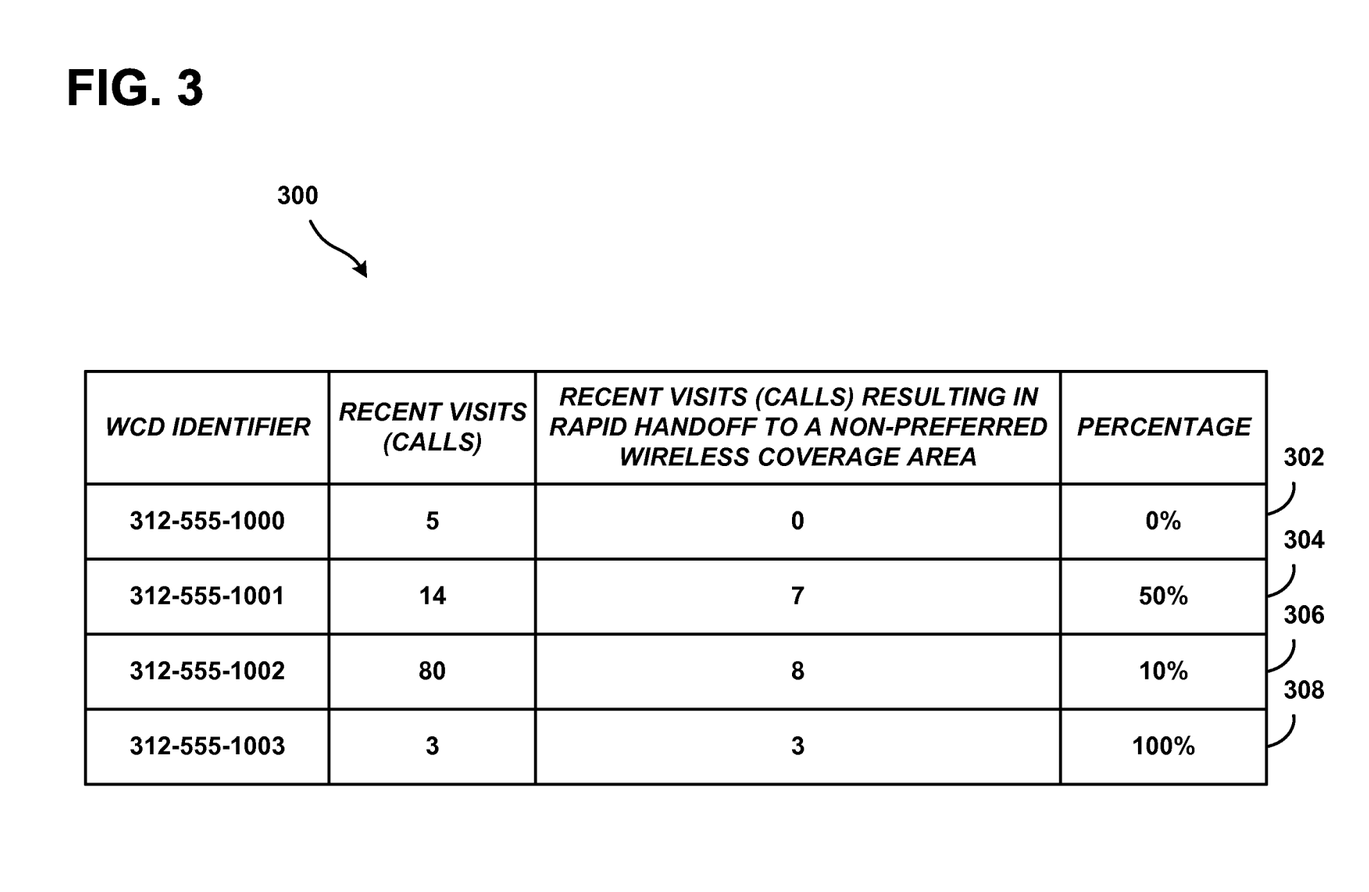
FIG. 3 is a table containing historical handoff data associated with several WCD identifiers, in accordance with an example embodiment.

A table like table 300 may be maintained for each preferred wireless coverage area. Further, a database storing data illustrated by table 300 may be maintained by a service provider, or a third party entity. The database may be maintained at an existing RAN component, as a standalone RAN component, or separate component to which the RAN has access. The information in a table such as table 300 may be presented or stored in other ways as well. As an alternative, the RAN may not include or have access to such a database, and may instead retrieve and determine the information for determining whether a WCD is likely to roam.

Preferably, the WCD identifier is a string of characters or bits that can be used to identify a WCD. Examples of WCD identifiers include but are not limited to network access identifiers (NAIs), mobile directory numbers (MDNs), mobile identification numbers (MINs), international mobile subscriber identifiers (IMSIs), electronic serial numbers (ESNs), and mobile equipment identifiers (MEIDs). Any of these types of WCD identifiers, or other data that can be used to identify WCDs, may be used in the "WCD identifier" column of table 300. For purposes of simplicity, entries 302, 304, 306, and 308 contain MDNs (phone numbers) as WCD identifiers, but other types of WCD identifiers may be used instead.

An entry in the "recent visits (calls)" column may be a count of recent visits that the WCD referred to in the WCD identifier column made to the preferred wireless coverage area. Such a visit may entail a WCD registering for service with the preferred wireless coverage area, but not necessarily making any calls in the preferred wireless coverage area. On the other hand, an entry in the recent visits/calls column may be a count of recent calls that the WCD made using resources of the preferred wireless coverage area. Such a call might be a voice call, a data call, or some other type of communication.

An entry in the "recent visits (calls) resulting in rapid handoff to a non-preferred wireless coverage area" column may be a count of recent visits that the WCD made to the preferred wireless coverage area in which the WCD was handed off to a non-preferred wireless coverage area within a relatively short period of time. Alternatively, an entry in this column may be count of recent calls that the WCD made, using the resources of the preferred wireless coverage area, in which the WCD was handed off to a non-preferred wireless coverage area within a relatively short period of time after call initiation. Preferably, this column measures the same types of event (i.e., calls or visits) that the "recent calls (visits)" column measures.

Regardless of whether calls or visits are measured, the "recent visits (calls) resulting in rapid handoff to a non-preferred wireless coverage area" column may be used to determine how frequently in the past that the WCD with the specified WCD identifier either registered for service with the preferred wireless coverage area and was rapidly handed off, or used resources of the preferred wireless coverage area and was rapidly handed off. If either event occurs frequently, this may indicate that the WCD is likely to be handed off from the preferred wireless coverage area to a non-preferred wireless coverage area in the future.

Thus, a WCD may register for service in the preferred wireless coverage area. Whether or not the WCD actually uses any bearer resources of the preferred wireless coverage area, the RAN may record the time of this registration. Accordingly, the RAN may increment the WCD's entry in the "recent visits (calls)" column of table 300. Then, the RAN may determine that the WCD has been handed off to a non-preferred wireless coverage area, and may record the time of the handoff. If the time between these two recorded events is less than a threshold duration (e.g., a few seconds to a few minutes), the RAN may deem the WCD to have been rapidly handed off to a non-preferred wireless coverage area. Therefore, the RAN may increment the WCD's entry in the "recent visits (calls) resulting in rapid handoff to a non-preferred wireless coverage area" column.

The RAN may learn that the handoff occurred in various ways. For instance, during the handoff process, the WCD may inform the RAN of the non-preferred wireless coverage area to which the WCD is being handed off. Or, the RAN may receive, from the roaming partner that controls the non-preferred wireless coverage area, signaling messages indicating that the WCD has been handed off to the non-preferred wireless coverage area.

On the other hand, the WCD may be taking part in a call via the preferred wireless coverage area. The RAN may receive an indication that the call leg between the RAN and the WCD was terminated, and may record the time of the termination, as well as the caller, callee, an identifier of the preferred wireless coverage area, and related information. A call leg may refer a segment of a call path between two devices. For purposes of illustration, if the WCD is engaged in a call with another WCD, an example of a call leg may be the air interface between the WCD and the WCD's serving BTS. Thus, when the WCD is handed off from a first BTS to a second BTS (and potentially a different wireless coverage area), the WCD may maintain the call but replace the call leg between the WCD and the first BTS with a call leg between the WCD and the second BTS.

Also, it should be understood that the function of a WCD being handed off from a preferred wireless coverage area to a non-preferred wireless coverage area, for purposes of determining the number of recent calls resulting in rapid handoff, is not necessarily a handoff of the same call, but instead may involve two calls. More specifically, while it is possible that a handoff may seamlessly transfer a call from one service provider's network to another's, users often have their WCDs set to prevent roaming and/or to prompt the user before engaging in a roaming call (thus avoiding or at least notifying the user of roaming fees). As such, the first call via the preferred wireless coverage area may terminate, and then the WCD may initiate the second call via the non-preferred wireless coverage area. Thus, a handoff may include an instance where a first call in a preferred wireless coverage area is dropped, and a second call is initiated in a nearby non-preferred wireless coverage area shortly thereafter (e.g., within a predetermined time period after the first call terminates).

The RAN may only receive notification that the call leg or call occurring via the preferred wireless coverage area was terminated, and thus may not be aware of whether the WCD continued the call in another wireless coverage area. Therefore the RAN may not be able to immediately determine whether the WCD (and therefore the call) was handed off to a non-preferred wireless coverage area. However, at a later point in time (e.g., minutes, hours, or days after the call was terminated), the home wireless service provider may receive records of call legs and/or calls engaged in by the home wireless service provider's subscribed mobiles in roaming partners' wireless coverage areas.

The communication of these records may be direct from the roaming partner to the home service provider, or may take place via a third party billing aggregator. The records may be formatted according to Transferred Account Procedure (TAP) or Cellular Intercarrier Billing Exchange Roamer (CIBER). Such records may comprise call detail records for each call or call leg made by a roaming WCD, including the WCD's location, the calling party, the called party, the time of the call, and the duration of the call.

By correlating these received records with similar records recorded by the RAN, the home wireless service provider may be able to determine whether a WCD that took part in a call via the preferred wireless coverage area was rapidly handed off to a non-preferred wireless coverage area and took part in another call via the non-preferred wireless coverage area.

For instance, the RAN may compare the caller and callee of a terminated call leg that took place in the preferred wireless coverage area to the caller and callee of call leg that subsequently took place in the non-preferred wireless coverage area. If the parties that took part in these calls are the same, this may indicate that the call was handed off from the preferred wireless coverage area to the non-preferred wireless coverage area, or that the call was dropped during the course of the handoff, and then reestablished via the non-preferred wireless coverage area. Regardless, if the time between the call being terminated in the preferred wireless coverage area and a corresponding call being initiated in the non-preferred wireless coverage area is below a threshold value, the RAN may increment the WCD's entry in the "recent visits (calls) resulting in rapid handoff to a non-preferred wireless coverage area" column.

An entry in the "percentage" column of table 300 indicates, for the WCD with the specified WCD identifier, the percentage of recent visits (calls) that were rapidly handed off to a non-preferred, wireless coverage area. Preferably, these entries result from dividing the WCD's entry in the "recent visits (calls) resulting in rapid handoff to a non-preferred wireless coverage area" by the WCD's entry in the "recent visits (calls)" column.

For instance, in record 302 for WCD identifier "312-555-1000", out of 5 recent visits (calls), none resulted in such a rapid handoff. Thus, the entry in the "percentage" column is 0%, indicating that the WCD with this identifier is unlikely to be handed off to a non-preferred wireless coverage area in the future. Similarly, in record 306 for WCD identifier "312-555-1002", the entry in the "percentage" column is 10%, also indicating that the WCD with this identifier is unlikely to be handed off to a non-preferred wireless coverage area in the future. On the other hand, the entries in the "percentage" column for records 304 and 308 are 50% and 100%, respectively. Thus, the WCDs with the identifiers "312-555-1001" and "312-555-1003" are likely to be handed off to a non-preferred wireless coverage area again in the future.

It should be understood that table 300 is only an example of the arrangement and type of information that a home wireless service provider might use to determine whether a WCD is likely to roam. Such information may be arranged in a table like table 300, but including more or fewer columns or rows. Each entry in the table may contain different information than is shown in table 300. For instance, contents of the "percentage" column could take be integers or non-integer values, and could signify a percentage using various representations.

Alternatively, the information may be arranged in a structure other than a table, such as a list, tree, or array.

Moreover, in addition to the ways of detecting that a WCD is likely to begin roaming discussed above, there may be other ways of performing such detection that are in accordance with the embodiments herein. Referring to FIG. 1A, if WCD 108 reports to RAN 103 that it is receiving pilot signals from preferred wireless coverage area 110 does not meet a threshold pilot signal strength (e.g., the receiving pilot signal strength is below a threshold pilot signal strength of −8 dB, −10 dB, or −12 dB), then RAN 103 may conclude that WCD 108 is likely to roam.

Or, if RAN 103 determines that preferred wireless coverage area 110 is congested, RAN 103 may conclude that WCD 108 is likely to roam. RAN 103 may make this determination by measuring the traffic channel utilization of preferred wireless coverage area 110, and ascertaining that the measured traffic channel utilization meets a threshold traffic channel utilization (e.g., the measured traffic channel utilization is above a threshold traffic channel utilization of 50%, 70%, or 80%). Alternatively or additionally, RAN 103 may make this determination by measuring the control channel (e.g., paging channel) utilization of preferred wireless coverage area 110, and ascertaining that the measured control channel utilization meets a threshold control channel utilization (e.g., the measured control channel utilization is above a threshold control channel utilization of 50%, 70%, or 80%).

b. Causing a WCD to Switch to a Different Frequency

In response to determining that a WCD is likely to begin roaming (regardless of how the likelihood of roaming is determined), the RAN may take steps to reduce this likelihood of roaming. Particularly, the RAN may cause the WCD to switch to a different frequency on which the WCD may be less likely to roam.

Suppose that preferred wireless coverage area 110 and non-preferred wireless coverage area 114 are both defined on a first frequency, but preferred wireless coverage area 112 is defined on a second frequency. WCD 108 may be served by preferred wireless coverage area 110. RAN 103 may determine that WCD 108 is likely to roam and may wind up being served by non-preferred wireless coverage area 114.

If WCD 108 is not on a call (i.e., WCD 108 is idle), RAN 103 may hand off WCD 108 to non-preferred wireless coverage area 114, because preferred wireless coverage area 110 and non-preferred wireless coverage area 114 are both defined on the same frequency. Due to these wireless coverage areas sharing the same frequency, RAN 103 may be able to perform a soft handoff from preferred wireless coverage area 110 to non-preferred wireless coverage area 114.

Further, WCD 108 may not be aware that preferred wireless coverage area 112 exists, as WCD 108 may not have scanned the second frequency (or may not be configured to scan the second frequency) that preferred wireless coverage area 112 is defined on. Thus, WCD 108 may not be able to notify RAN 103 that WCD 108 is within range of preferred wireless coverage area 112. Therefore, it may be beneficial for RAN 103 to redirect WCD 108 from the first frequency to the second frequency so that WCD 108 can become aware of and register with preferred wireless coverage area 112.

Accordingly, if RAN 103 determines that WCD 108 is likely to roam, RAN 103 may, for example, transmit a redirect message to WCD 108. The redirect message may instruct WCD 108 to switch from the first frequency to the second frequency. The redirect message may take the form of a global service redirect message, or any other type of message that RAN 103 transmits to WCD 108. Upon receiving this message, WCD 108 may de-register from preferred wireless coverage area 110 and register with preferred wireless coverage area 112.

If WCD 108 is on a call (i.e., WCD 108 is active), WCD 108 switching from the first frequency to the second frequency may result in the call being dropped. Accordingly, upon receiving the redirect message, WCD 108 may either switch from the first frequency to the second frequency (and therefore accept the risk of the call being dropped), or delay acting on the redirect message for some period of time. For instance, WCD 108 may switch from the first frequency to the second frequency after the call is completed or otherwise terminated.

In some embodiments, the second frequency may be lower than the first frequency, and RAN 103 may transmit the redirect message to WCD 108 because of this relationship between the frequencies. Wireless coverage areas defined on lower frequencies may exhibit a wider coverage (due to, e.g., less attenuation) than wireless coverage areas defined on higher frequencies. Further, wireless coverage areas defined on lower frequencies may penetrate structures (e.g., into buildings) better than wireless coverage areas defined on higher frequencies. Thus, serving WCDs on lower-frequency wireless coverage areas may be generally preferable to serving WCDs on higher-frequency wireless coverage areas. However, since every wireless coverage area has a limited capacity, a wireless service provider may be unable to serve all of its subscribed WCDs with lower-frequency wireless coverage areas. Therefore, the wireless service provider may seek to trade off between the usually superior coverage of lower-frequency wireless coverage areas with the desirability of having balanced load across its wireless coverage areas.

Accordingly, suppose that a preferred wireless coverage area 110 is defined at 1900 MHz and preferred wireless coverage area 112 is defined at 800 MHz. The wireless service provider may configure RAN 103 to balance WCDs seeking service across these wireless coverage areas. Thus, RAN 103 may assign roughly half of these WCDs to preferred wireless coverage area 110, and roughly half of these WCDs to preferred wireless coverage area 112. Alternatively, the wireless service provider may configure RAN 103 to initially assign the WCDs to preferred wireless coverage area 110, and later redirect some of these WCDs to preferred wireless coverage area 112 as needed.

VI. Preserving WCD Battery Life

In additional embodiments, a RAN may cause a WCD to switch frequencies, as described above, in order to preserve the WCD's battery life. Lower-frequency wireless signals generally suffer from less attenuation than higher-frequency wireless signals. As a result, a WCD served by a lower-frequency wireless coverage area may be able to transmit information to the RAN at a lower power level (and thus use less battery power) than if the WCD was served via a higher-frequency wireless coverage area. In general, the more extensive coverage of the lower-frequency wireless coverage area may result in the WCD's battery being drained more slowly when the WCD is served by the lower-frequency wireless coverage area.

A RAN (such as RAN 103) may receive a measurement of the remaining battery life of a WCD (such as WCD 108). If this remaining battery life meets a battery life threshold, the RAN may transmit a redirect message to the WCD, instructing the WCD to switch from a higher frequency to a lower frequency.

The WCD may periodically, or from time to time, transmit a measurement of its remaining battery life to the RAN. This measurement may be included in a radio environment report message that the WCD transmits to the RAN, or in any other message that the WCD transmits to the RAN. The measurement may, for example, take the form of a percentage of remaining battery life. Thus, the threshold remaining battery life may take on values such as 50%, 20%, 10%, and so on.

Also as discussed above, if the WCD is idle, the WCD may switch from the first frequency to the second frequency upon receiving the redirect message. On the other hand, if the WCD is active, the WCD may wait until it is idle before switching from the first frequency to the second frequency. At some later point, the WCD or the RAN may determine that the WCD's remaining battery life has improved to the point at which it no longer meets the battery life threshold.

VII. Example Methods

Figure 4:
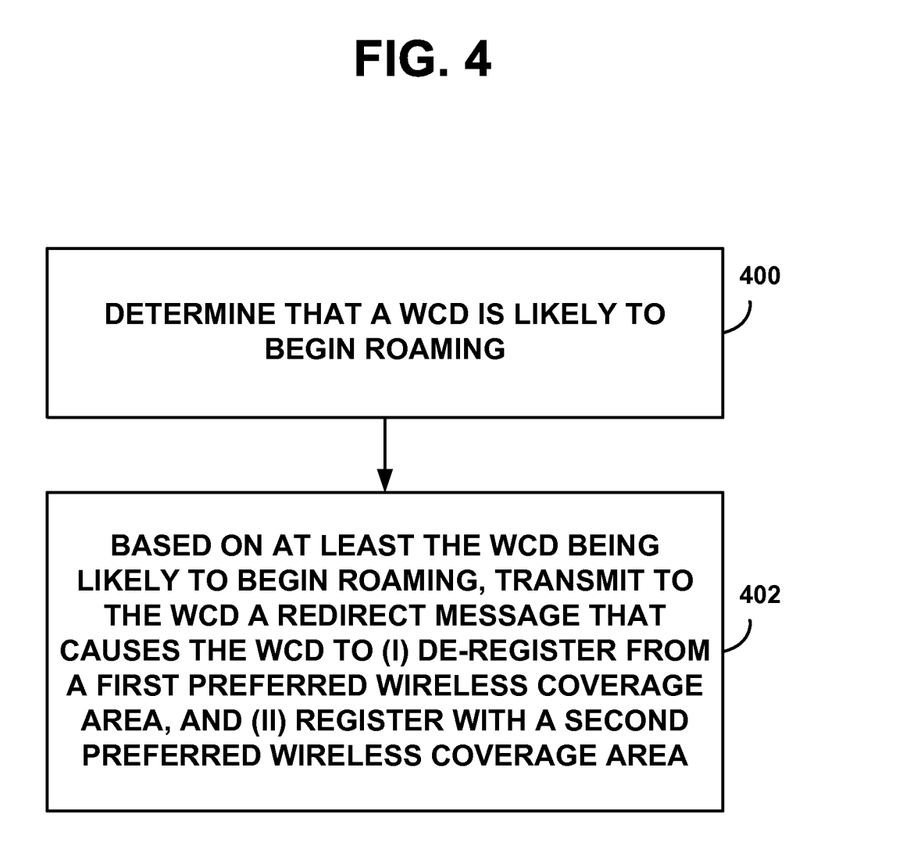
FIG. 4 is a flow chart, in accordance with an example embodiment.

FIG. 4 is a flow chart illustrating a method according to an example embodiment. In this embodiment, a RAN may radiate to define a first preferred wireless coverage area on a first frequency and a second preferred wireless coverage area on a second frequency. At step 400, the RAN may determine that a WCD that the RAN is serving via the first wireless coverage area is likely to begin roaming. At step 402, based on at least the WCD being likely to begin roaming, the RAN may transmit to the WCD a redirect message that causes the WCD to (i) de-register from the first preferred wireless coverage area, and (ii) register with the second preferred wireless coverage area.

The second frequency may be lower than the first frequency. For example, the first frequency may be above 1700 MHz while the second frequency is below 1000 MHz. Alternatively, the first frequency may be above 1800 MHz while the second frequency is below 900 MHz, the first frequency may be above 1900 MHz while the second frequency is below 850 MHz, or the first frequency may be above 2500 MHz while the second frequency is below 800 MHz. However, other arrangements of the first and second frequencies may be possible.

The RAN may transmit the redirect message to the WCD also based on the second frequency being lower than the first frequency. Alternatively or additionally, the RAN may transmit the redirect message to the WCD also based on receiving a measurement of a remaining battery life of the WCD and determining that the remaining battery does not meet a battery life threshold. Further, if the RAN transmits the redirect message to the WCD while the WCD is engaged in a call, the RAN may receive an indication that the WCD registered with the second preferred wireless coverage area after the call was concluded.

Wireless coverage areas may be either preferred or non-preferred. Thus, the RAN determining that the WCD is likely to begin roaming may involve the RAN determining that roaming data indicates that the WCD is likely to be handed off from the first preferred wireless coverage area to any one of a group of one or more non-preferred wireless coverage areas. Accordingly, the RAN may have access to a table that maps WCD identifiers to respective handoff data associated with each respective WCD identifier. Therefore, determining that the WCD is likely to be handed off from the first preferred wireless coverage area to any one of the group of one or more non-preferred wireless coverage areas may include determining a given WCD identifier of the WCD, looking up the determined given WCD identifier in the table, and based on given respective handoff data that is stored in the table and associated with the given WCD identifier, determining that, in the past, the WCD has been handed off from the preferred wireless coverage area to any one of the group of one or more non-preferred wireless coverage areas.

The given respective handoff data may contain a percentage, associated with the given WCD identifier, representing how frequently the WCD has been handed off from the preferred wireless coverage area to any one of the group of one or more non-preferred wireless coverage areas. Thus, the RAN determining that, in the past, the WCD has been handed off from the preferred wireless coverage area to any one of the group of one or more non-preferred wireless coverage areas may involve the RAN determining that the percentage is greater than a handoff frequency threshold. The handoff frequency threshold may take on any reasonable value, such as 50%, 70%, or 80%.

Additionally or alternatively, the RAN may determine that the WCD is likely to begin roaming in other ways. For instance, the RAN may determine that a strength at which the WCD receives pilot signals from the first preferred wireless coverage area does not meet a threshold pilot signal strength. The threshold pilot signal strength may take on any reasonable value, such as −8 dB, −10 dB, or −12 dB.

In another example, the RAN may determine that the WCD is likely to begin roaming by determining that a channel utilization (e.g., a traffic channel utilization and/or a control channel utilization) of the first preferred wireless coverage area meets a channel utilization threshold. The channel utilization threshold may take on any reasonable value, such as 50%, 70%, or 80%.

Additionally, after serving the WCD via the second wireless coverage area, the RAN may determine that the WCD is unlikely to begin roaming via a third preferred wireless coverage that the RAN defines on the first frequency. Based on the WCD being unlikely to begin roaming via the third preferred wireless coverage area, the RAN may transmit to the WCD a second redirect message that causes the WCD to (i) de-register from the second preferred wireless coverage area, and (ii) register with the third preferred wireless coverage area. By switching back to a wireless coverage area defined on the first frequency, the WCD potentially allows other WCDs that are more in need of using the second frequency to use the second frequency. Thus, the capacity of wireless coverage areas defined on the second frequency is conserved.

It should be understood that the flow chart of FIG. 4 is a non-limiting embodiment. Thus, more or fewer steps than shown may be used without departing from the scope of the invention. Additionally, each and any of these steps may be repeated one or more times, or may occur in a different order than shown in FIG. 4 or described above.

Figure 5:
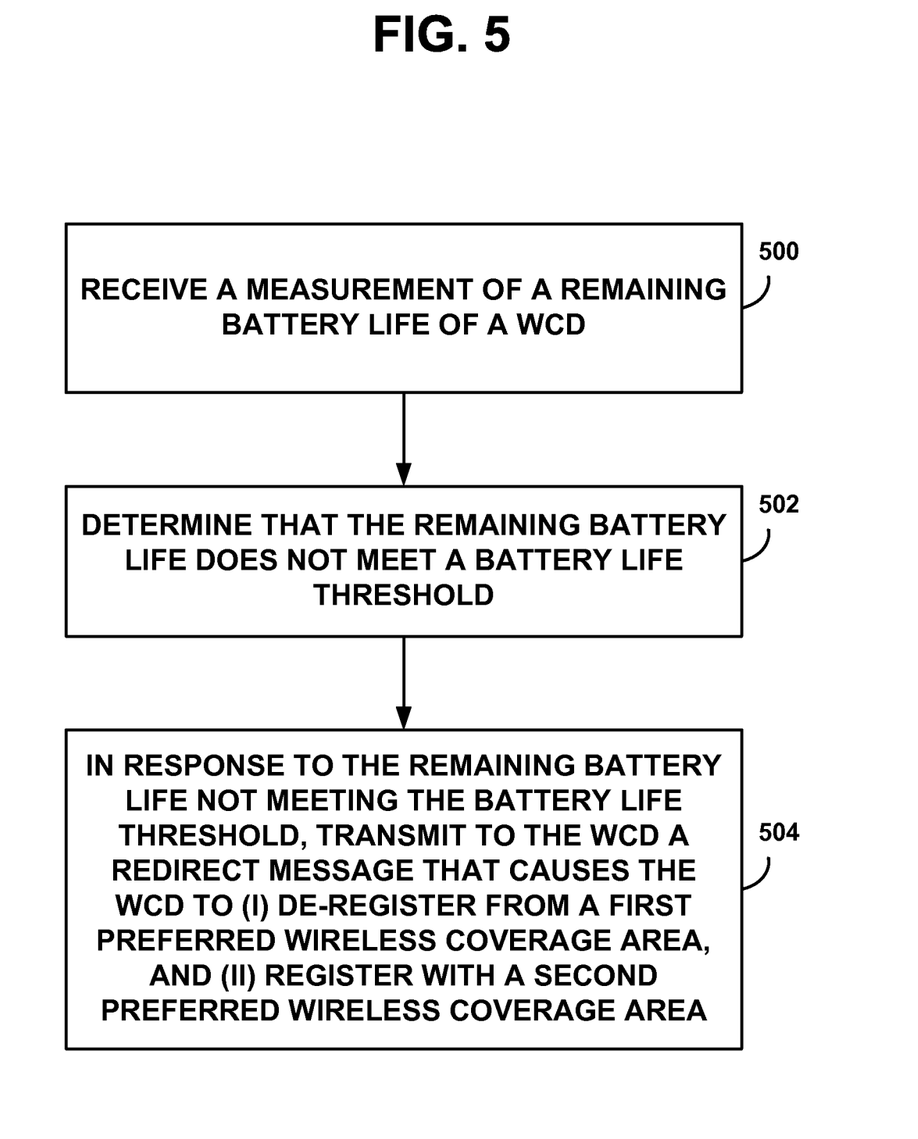
FIG. 5 is another flow chart, in accordance with an example embodiment.

FIG. 5 is a flow chart illustrating a method according to another example embodiment. Like the embodiment of FIG. 4, a RAN may radiate to define a first preferred wireless coverage area on a first frequency and a second preferred wireless coverage area on a second frequency. The second frequency may be lower than the first frequency. At step 500, the RAN may receive a measurement of a remaining battery life of a WCD that the RAN serves via the first preferred wireless coverage area.

At step 502, the RAN may determine that the remaining battery life does not meet a battery life threshold. At step 504, in response to the remaining battery life not meeting the battery life threshold, the RAN may transmit to the WCD a redirect message that causes the WCD to (i) de-register from the first preferred wireless coverage area, and (ii) register with the second preferred wireless coverage area.

Like the flow chart of FIG. 4, the flow chart of FIG. 5 is a non-limiting embodiment. More or fewer steps than shown may be used without departing from the scope of the invention. Additionally, each and any of these steps may be repeated one or more times, or may occur in a different order than shown in FIG. 5 or described above. Moreover, aspects of the embodiment of FIG. 4 described herein may be used with or combined with the flowchart of FIG. 5.

VIII. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:
a radio access network (RAN) determining that a wireless communication device (WCD) is likely to begin roaming, wherein the RAN serves the WCD via a first preferred wireless coverage area that is defined by the RAN on a first frequency, wherein the first preferred wireless coverage area is operated by a home wireless service provider of the WCD;
based on at least the WCD being likely to begin roaming, the RAN transmitting to the WCD a redirect message that causes the WCD to (i) de-register from the first preferred wireless coverage area, and (ii) register with a second preferred wireless coverage area that is defined by the RAN on a second frequency, wherein the second preferred wireless coverage area is operated by the home wireless service provider, and
wherein determining that the WCD is likely to begin roaming comprises determining that roaming data indicates that the WCD is likely to be handed off from the first preferred wireless coverage area to any one of a group of one or more non-preferred wireless coverage areas that are not operated by the home wireless service provider,
wherein the RAN has access to a table that maps WCD identifiers to respective handoff data associated with each respective WCD identifier, and wherein determining that the WCD is likely to be handed off from the first preferred wireless coverage area to any one of the group of one or more non-preferred wireless coverage areas comprises: determining a given WCD identifier of the WCD, looking up the determined given WCD identifier in the table, based on given respective handoff data that is stored in the table and associated with the given WCD identifier, determining that, in the past, the WCD has been handed off from the first preferred wireless coverage area to any one of the group of one or more non-preferred wireless coverage areas.

2. The method of claim 1, wherein the second frequency is lower than the first frequency, and wherein the RAN transmitting the redirect message to the WCD is also based on the second frequency being lower than the first frequency.

3. The method of claim 1, wherein the given respective handoff data comprises a percentage, associated with the given WCD identifier, representing how frequently the WCD has been handed off from the first preferred wireless coverage area to any one of the group of one or more non-preferred wireless coverage areas, and wherein determining that, in the past, the WCD has been handed off from the first preferred wireless coverage area to any one of the group of one or more non-preferred wireless coverage areas comprises:
the RAN determining that the percentage is greater than a handoff frequency threshold.

4. The method of claim 1, wherein determining that the WCD is likely to begin roaming comprises:
determining that a strength at which the WCD receives pilot signals from the first preferred wireless coverage area does not meet a threshold pilot signal strength.

5. The method of claim 1, wherein determining that the WCD is likely to begin roaming comprises:
determining that a channel utilization of the first preferred wireless coverage area meets a channel utilization threshold.

6. The method of claim 1, wherein the RAN transmitting the redirect message to the WCD is also based on (i) the RAN receiving a measurement of a remaining battery life of the WCD, and (ii) the RAN determining that the remaining battery does not meet a battery life threshold.

7. The method of claim 1, wherein the RAN transmitting the redirect message to the WCD occurs while the WCD is engaged in a call, the method further comprising:
the RAN receiving an indication that the WCD registered with the second preferred wireless coverage area after the call was concluded.

8. The method of claim 1, further comprising:
after serving the WCD via the second preferred wireless coverage area, the RAN determining that the WCD is unlikely to begin roaming when served by a third preferred wireless coverage area, wherein the RAN defines the third preferred wireless coverage area on the first frequency, and wherein the third preferred wireless coverage area is controlled by the home wireless service provider; and
based on the WCD being unlikely to begin roaming when served by the third preferred wireless coverage area, the RAN transmitting to the WCD a second redirect message that causes the WCD to (i) de-register from the second preferred wireless coverage area, and (ii) register with the third preferred wireless coverage area.

9. An article of manufacture including a non-transitory computer-readable medium, having stored thereon program instructions that, when executed by a radio access network (RAN) device, cause the RAN device to perform operations comprising:
determining that a wireless communication device (WCD) is likely to begin roaming, wherein the RAN radiates to define a first preferred wireless coverage area on a first frequency and a second preferred wireless coverage area on a second frequency, wherein the RAN serves the WCD via the first preferred wireless coverage area, and wherein the first preferred wireless coverage area and second preferred wireless coverage area are operated by a home wireless service provider of the WCD;
based on at least the WCD being likely to begin roaming, transmitting to the WCD a redirect message that causes the WCD to (i) de-register from the first preferred wireless coverage area, and (ii) register with the second preferred wireless coverage area, wherein determining that the WCD is likely to begin roaming comprises determining that roaming data indicates that the WCD is likely to be handed off from the first preferred wireless coverage area to any one of a group of one or more non-preferred wireless coverage areas that are not operated by the home wireless service provider;
after serving the WCD via the second wireless coverage area, determining that the WCD is unlikely to begin roaming when served by a third preferred wireless coverage area, wherein the RAN defines the third preferred wireless coverage area on the first frequency and wherein the third preferred wireless coverage area is controlled by the home wireless service provider; and based on the WCD being unlikely to begin roaming when served by the third preferred wireless coverage area, transmitting to the WCD a second redirect message that causes the WCD to (i) de-register from the second preferred wireless coverage area, and (ii) register with the third preferred wireless coverage area.

10. The article of manufacture of claim 9, wherein the second frequency is lower than the first frequency, and wherein transmitting the redirect message to the WCD is also based on the second frequency being lower than the first frequency.

11. The article of manufacture of claim 9, wherein the RAN has access to a table that maps WCD identifiers to respective handoff data associated with each respective WCD identifier, and wherein determining that the WCD is likely to be handed off from the first preferred wireless coverage area to any one of the group of one or more non-preferred wireless coverage areas comprises:
   determining a given WCD identifier of the WCD;
   looking up the determined given WCD identifier in the table; and
   based on given respective handoff data that is stored in the table and associated with the given WCD identifier, determining that, in the past, the WCD has been handed off from the first preferred wireless coverage area to any one of the group of one or more non-preferred wireless coverage areas.

12. The article of manufacture of claim 11, wherein the given respective handoff data comprises a percentage, associated with the given WCD identifier, representing how frequently the WCD has been handed off from the first preferred wireless coverage area to any one of the group of one or more non-preferred wireless coverage areas, and wherein determining that, in the past, the WCD has been handed off from the first preferred wireless coverage area to any one of the group of one or more non-preferred wireless coverage areas comprises:
   the RAN determining that the percentage is greater than a handoff frequency threshold.

13. The article of manufacture of claim 9, wherein determining that the WCD is likely to begin roaming comprises:
   determining that a strength at which the WCD receives pilot signals from the first preferred wireless coverage area does not meet a threshold pilot signal strength.

14. The article of manufacture of claim 9, wherein determining that the WCD is likely to begin roaming comprises:
   determining that a channel utilization of the first preferred wireless coverage area meets a channel utilization threshold.

15. The article of manufacture of claim 9, wherein transmitting the redirect message to the WCD is also based on (i) receiving a measurement of a remaining battery life of the WCD, and (ii) determining that the remaining battery does not meet a battery life threshold.

16. The article of manufacture of claim 9, wherein transmitting the redirect message to the WCD occurs while the WCD is engaged in a call, and wherein the program instructions, when executed by the RAN, cause the RAN to perform operations further comprising:
   receiving an indication that the WCD registered with the second preferred wireless coverage area after the call was concluded.

* * * * *